Oct. 22, 1940.  A. C. CATLAND  2,218,743
WELL REAMER
Filed April 23, 1937  2 Sheets-Sheet 1
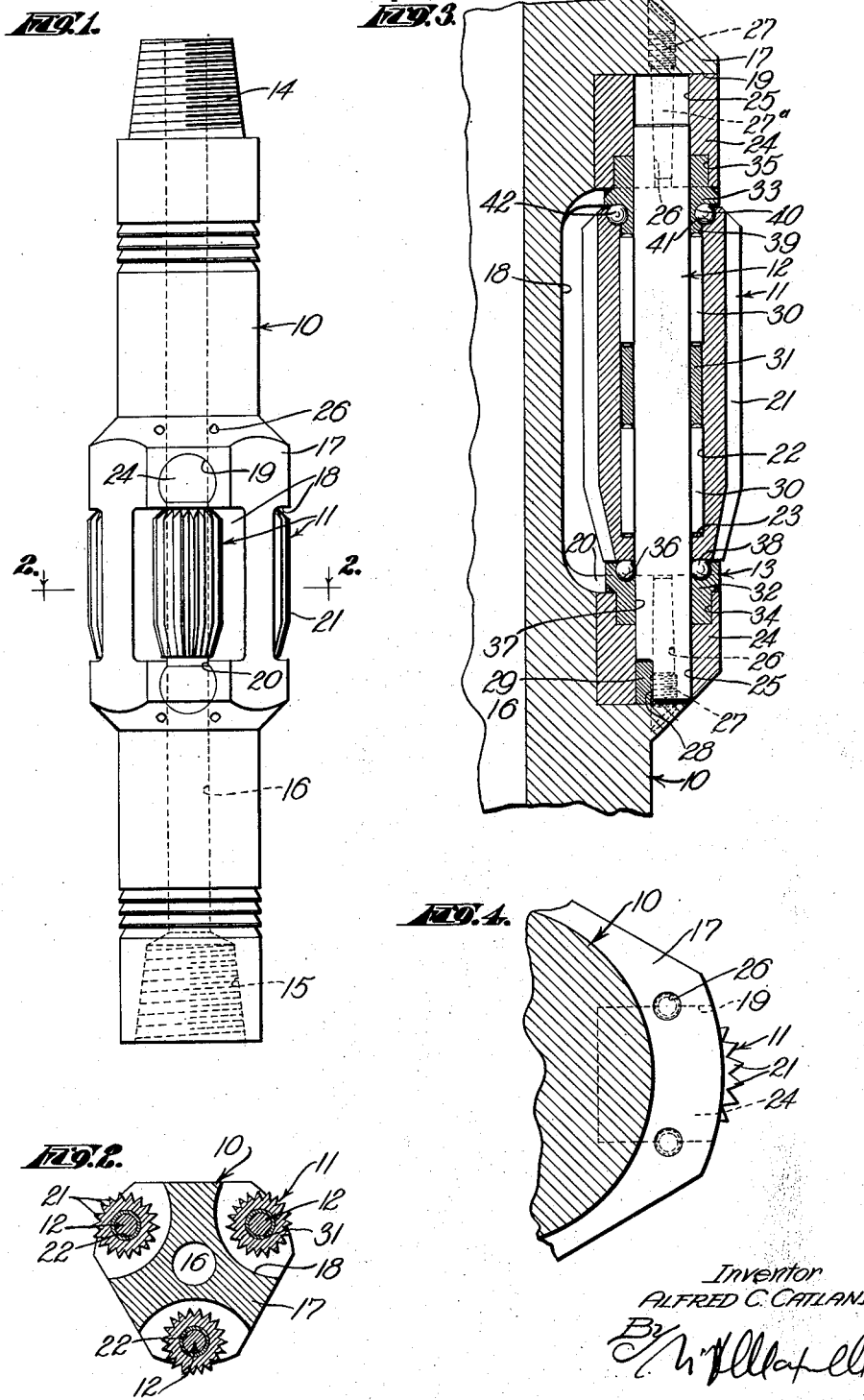
Inventor
ALFRED C. CATLAND
By
His Attorney Oct. 22, 1940.   A. C. CATLAND   2,218,743
WELL REAMER
Filed April 23, 1937   2 Sheets-Sheet 2
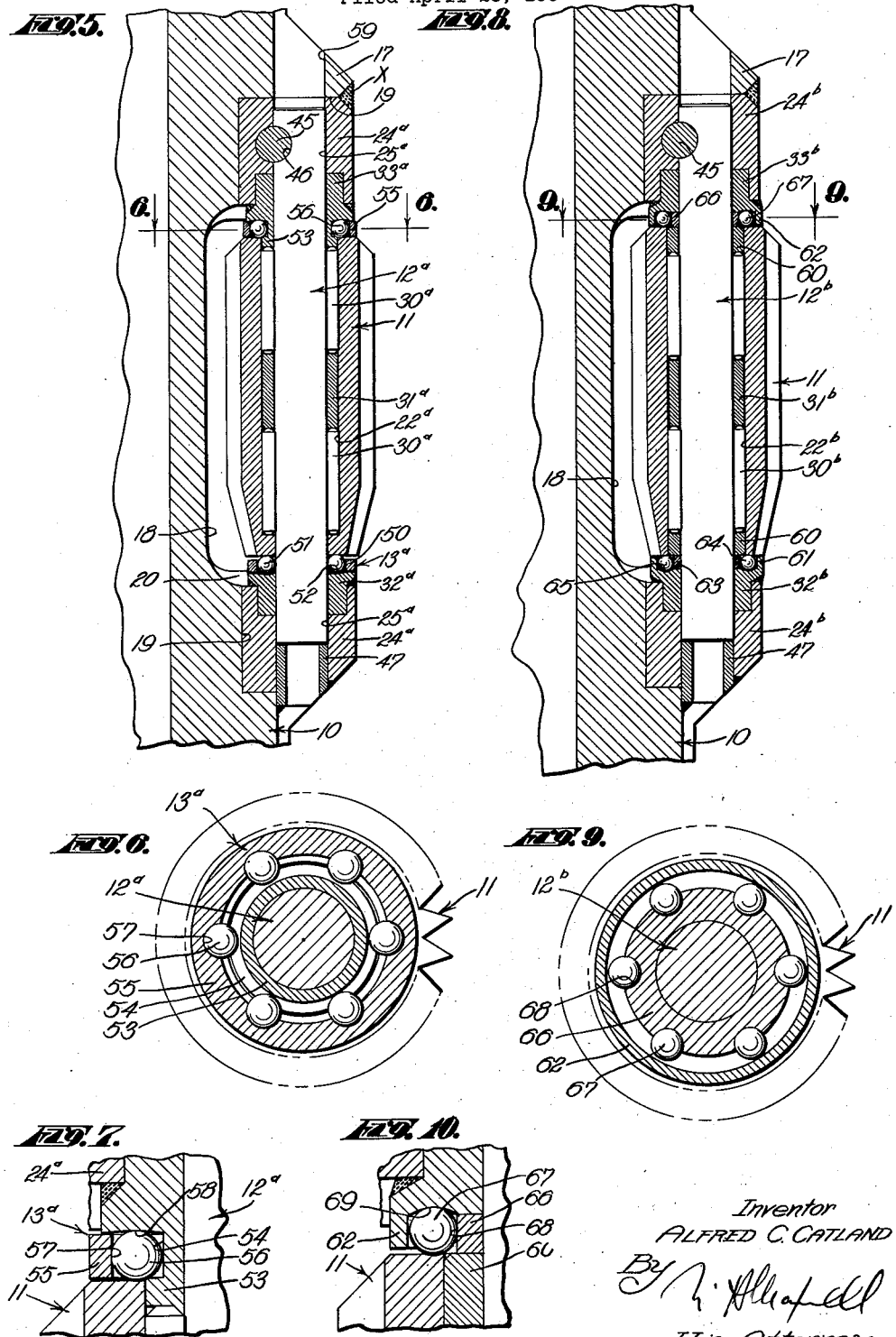
Inventor
ALFRED C. CATLAND
By
His Attorney Patented Oct. 22, 1940

2,218,743

UNITED STATES PATENT OFFICE 2,218,743

WELL REAMER

Alfred C. Catland, Alhambra, Calif., assignor to Globe Oil Tools Company, Los Nietos, Calif., a corporation of California Application April 23, 1937, Serial No. 138,599

2 Claims. (Cl. 255—73)

This invention relates to well drilling tools and relates more particularly to well reamers. A general object of this invention is to provide a well reamer embodying dependable long wearing anti-friction bearings for the reaming cutters.

Another object of this invention is to provide a reamer for use in the rotary method of well drilling that embodies novel and particularly effective anti-friction thrust bearings for the cutters.

Another object of this invention is to provide a rotary well reamer in which the cutters are supported against radial thrust by roller bearings and are supported against axial thrust in both directions by ball bearings.

Another object of this invention is to provide a reamer of the character mentioned in which the bearings and the other elements of the cutter mountings may be readily replaced when worn.

The various objects and features of my invention will be fully understood from the following detailed description of typical preferred forms and applications of the invention, throughout which description reference is made to the accompanying drawings, in which:

Fig. 1 is a side elevation of one form of well reamer provided by this invention. Fig. 2 is a transverse detailed sectional view taken as indicated by line 2—2 on Fig. 1. Fig. 3 is an enlarged fragmentary vertical detailed sectional view of the reamer illustrated in Figs. 1 and 2 showing one of the cutters and its bearing means. Fig. 4 is a fragmentary horizontal detailed sectional view illustrating the means for locking the blocks in place. Fig. 5 is a view similar to Fig. 3 illustrating another form of bearing means for rotatably supporting the cutters. Fig. 6 is an enlarged horizontal detailed sectional view taken as indicated by line 6—6 on Fig. 5. Fig. 7 is an enlarged fragmentary vertical detailed sectional view illustrating one of the thrust bearings illustrated in Figs. 5 and 6. Fig. 8 is a view similar to Figs. 3 and 5 illustrating still another form of cutter supporting means. Fig. 9 is an enlarged horizontal detailed sectional view taken as indicated by line 9—9 on Fig. 8 and Fig. 10 is an enlarged fragmentary vertical sectional view of one of the thrust bearings illustrated in Fig. 8.

The present invention may be embodied in well reamers varying somewhat in design and construction. In the following detailed description I will describe three typical forms and applications of the invention, it being understood that the invention is not to be construed as limited or restricted to the specific forms or embodiments about to be described.

The reamer of the present invention illustrated in Figs. 1 to 4, inclusive, of the drawings includes, generally, a shank or body 10, reaming cutters 11, cutter supporting pins 12 and anti-friction bearing means 13 for the cutters 11.

The body 10 is an elongate member or structure adapted to be connected in a rotary well drilling string. The body 10 is provided at its opposite ends with means for facilitating its connection in the drilling string. In the particular case illustrated this means comprises a tapered threaded pin 14 on the upper end of the body and a tapered threaded socket 15 in the lower end of the body. A longitudinal fluid passage 16 extends through the body 10 from one end to the other to conduct the circulation fluid. The body 10 has an intermediate portion 17 of enlarged diameter or of increased thickness. The body portion 17 is substantially triangular in horizontal cross section and vertically or longitudinally extending recesses 18 are provided in its apices. The ends of the intermediate portion 17 of the body 10 are preferably inclined or bevelled off as illustrated in Figs. 1 and 3 of the drawings. The recesses 18 are provided to carry the cutters 11 and have flat parallel upper and lower walls and curved concave inner walls. In the form of the invention illustrated in Figs. 1 to 4, inclusive, sockets 19 are provided in the body portion 17 at the upper and lower ends of the recesses 18. The sockets 19 are preferably cylindrical and their longitudinal axes are radial with respect to the vertical axis of the reamer. Flat walled notches 20 are provided in the upper and lower walls of the recesses 18. The notches 20 extend to the outer surfaces of the body portion 17 and merge with or join the cylindrical sockets 19.

The cutters 11 are provided to act on the side walls of the well bore and are in the nature of roller cutters. The cutters 11 are supported on the pins 12 through the bearing means 13 to rotate in the recesses 18 about substantially vertical axes. The three cutters 11 may be alike in size and shape. The reaming cutters 11 are elongate cylindrical members and their lower portions are preferably tapered or conical. Peripheral cutting teeth 21 are provided on the cutters 11. In the particular case illustrated the teeth 21 are straight and axial and extend throughout the lengths of the cutters, it being understood that the teeth 21 may be pitched or curved or formed in other manners. The cutters 11 are tubular, each having a central longitudinal opening 22. The lower portions of the cutter openings 22 are reduced in diameter to provide the cutters 11 with lower ends of substantial area and to provide upwardly facing shoulders 23 in the openings 22. The upper and lower ends of the cutters 11 are preferably flat and parallel.

The pins 12 are provided to support the rotatable cutters 11 in the body recesses 18. The pins 12 may be simple cylindrical members as illustrated. In accordance with the invention the pins 12 extend through the cutter openings 22 with substantial clearance and extend through the reduced lower portions of the openings 22 with slight suitable clearance. The pins 12 project or extend beyond the upper and lower ends of the cutters 11 and the invention provides means for mounting or supporting the projecting portions of the pins on the body 10. Blocks 24 are provided to occupy the sockets 19. The blocks 24 are cylindrical to fit the sockets 19 and their outer surfaces are preferably flush with the surfaces of the body portion 17 when their inner ends bear on the inner walls of the sockets. The blocks 24 have transverse or vertical openings 25 which receive the opposite end portions of the pins 12. Thus the pins 12 are supported on the body 10 through the medium of the blocks 24.

Means are provided to prevent turning of the blocks 24 and outward displacement of the blocks from the sockets 19. Vertical openings 26 enter the body portion 17 from its opposite ends and pass through the peripheral portions of the blocks 24 in the sockets 19. Tapered pins 27ᵃ are arranged in the openings 26 and cooperate with the blocks 24 to set or lock the blocks in the proper positions. Set screws 27 are threaded in the outer portions of the openings 26 to hold the pins 27ᵃ in cooperation with the blocks 24. The cylindrical blocks 24 fitting the cylindrical sockets 19 are definitely held against vertical movement in both directions and inward movement through direct contact with the walls of the sockets, and thus dependably support the cutter pins 12 on the body 10. Means are preferably provided to prevent rotation of the pins 12 in the openings 25. Each pin 12 has a flat portion 28 adjacent one end engaged by a lug 29 fixed in the opening 25 of a block 24. The lugs 29 cooperating with the flat pin portions 28 definitely prevent turning of the pins 12.

The bearing means 13 are an outstanding feature of the invention. The means 13 include two sets or series of rollers 30 in the opening 22 of each cutter 11 for rotatably supporting the cutters against the radial thrusts. The sets of bearings or rollers 30 are spaced apart by tubular spacers 31 on the pins 12. The lower ends of the lowermost sets of rollers 30 may rest on the shoulders 23. The upper ends of the uppermost rollers 30 are preferably spaced below the upper ends of the cutters 11. It will be apparent how the rollers 30 dependably support the cutters 11 against the radial operating thrusts and transmit the radial thrusts inwardly to the pins 12.

The bearing means 13 further include race parts 32 on the lower blocks 24 and race parts 33 on the upper blocks 24. The race parts 32 and 33 may be formed integral with the blocks 24. In the particular structure illustrated the race parts are separately formed members in which case the parts 32 are set in sockets 34 in the lower blocks 24 and are welded to the blocks and the race parts 33 are set in sockets 35 in the upper blocks 24 and are welded to the blocks. The race parts 32 project beyond the upper ends of the lower blocks 24 and their upper ends are adjacent the lower ends of the cutters 11. The parts 32 and 33 are tubular and surround the cutter pins 12. Annular ball races 36 are provided in the upper ends of the race parts 32. The races 36 surround and join the openings 37 in the parts 32 and may be of substantial depth. The means 13 includes annular series of balls 38 arranged in the races 36 to cooperate with the lower ends of the cutters 11. The balls 38 effectively transmit the downward thrusts from the cutters 11 to the race parts 32 with a minimum of friction. The races 36 are of such depth that the balls 38 are prevented from falling or becoming displaced from the assembly.

Ball bearing means are provided to take the upward thrusts from the cutters 11. Tubular flanges 39 are provided on the race parts 33 and project downwardly into the cutter openings 22. Annular races 40 are provided in the corners between the flanges 39 and the lower faces of the parts 33. Similar annular ball races 41 are provided in the upper ends of the cutters 11 where the walls of the cutter openings 22 join the upper faces of the cutters. The races 40 and 41 are in opposition and annular series of balls 42 cooperate with the opposing races 40 and 41. The balls 42 operate to transmit the upward thrusts from the cutters 11 to the race parts 33 with a minimum of friction. Due to the locations and the relationship of the races 40 and 41 the balls 42 may transmit some of the radial thrusts from the cutters 11 to the race parts 33.

In assembling one of the cutters 11 on the reamer body 10 the rollers 30 and the spacer 31 are inserted in the cutter opening 22 and the blocks 24 are positioned at the opposite ends of the cutter. The series of balls 38 and 42 are arranged in place between the race parts 32 and 33 and the ends of the cutter. The pin 12 is then passed through the assembly and the assembly is mounted on the body 10 by inserting the blocks 24 in the sockets 19. When the blocks 24 are inserted in the sockets 19 the projecting portions of the parts 32 and 33 enter the notches 20. The blocks 24 may be secured in place by the tapered pins 27ᵃ which are forced inwardly by the set screws 27.

In the operation of the reamer the body 10 is interposed in a well drilling string which is to be operated in a well. When the drilling string is rotated in the well bore the cutters 11 projecting from the mouths of the body recesses 18 engage and cut away the formation at the side wall of the bore. The cutters 11 being supported for rotation independently rotate about their own axes. The bearing means 13 support the cutters 11 so that they may rotate with a minimum of friction. The principal end thrusts or upward thrusts are transmitted from the cutters 11 to the race parts 33 by the annular series of balls 42. The downward thrusts on the cutters 11 are transmitted through the balls 38 to the race parts 32. When the cutters or the bearing means become worn the blocks 24 may be easily removed from the sockets 19 to permit the replacement of the worn parts.

Figs. 5, 6 and 7 of the drawings illustrate another form of mounting and bearing means for supporting the cutters on the reamer body. While these figures illustrate only one cutter 11 and its mounting it is to be understood that a similar construction may be employed to mount the several cutters of the reamer. The cutter 11 and the body 10 of the construction illustrated in Figs. 5, 6 and 7 may be identical with those described above and corresponding reference numerals will be employed on these corresponding parts. The construction illustrated in Figs. 5, 6 and 7 includes a cutter supporting pin $12^a$ extending through the body recess 18 and the cutter 11 and bearing means $13^a$ for the cutter 11.

The pin $12^a$ passes longitudinally through the cutter opening $22^a$ with substantial clearance and projects beyond the opposite ends of the cutter. Blocks $24^a$ are set in the sockets 19 in the body 10 and have vertical openings $25^a$ receiving the opposite end portions of the pin. In this construction the cutter 11 and its bearing means may be assembled in place on the body 10 and may be removed from the body without disturbing the blocks $24^a$ and the blocks may be welded to the body as at X. A pin 45 may be arranged through a transverse opening in the body 10 and an opening in one of the blocks $24^a$ to cooperate with a notch 46 in the pin $12^a$ to prevent turning of the pin. A tubular stop 47 may be arranged in the opening $25^a$ of the lower block $24^a$ to limit the downward movement of the pin $12^a$.

The bearing means $13^a$ includes two sets of rollers $30^a$ in the cutter opening $22^a$ held in spaced relation by a tubular spacer $31^a$. The rollers $30^a$ and the spacer $31^a$ may rest on the shoulder 23 in the cutter. The spaced sets of rollers $30^a$ are operable to transmit the radial thrusts from the cutter 11 to the supporting pin $12^a$.

The means $13^a$ also operates to transmit the downward thrusts from the cutter 11 to the lower block $24^a$. A race part $32^a$ is provided on the lower block $24^a$. While I have illustrated the part $32^a$ set in a socket in the block $24^a$ and welded to the block it is to be understood that the part $32^a$ may be formed integral with the block if desired. The part $32^a$ projects from the upper end of the block $24^a$ and its upper end opposes the lower end of the cutter 11. A ball bearing is interposed between the upper end of the part $32^a$ and the lower end of the cutter 11. This ball bearing includes an annular retainer 50 and spaced balls 51 held in the interior of the retainer to cooperate with the lower end of the cutter 11 and a race 52 in the upper end of the part $32^a$. The retainer 50 holds the balls 51 in proper spaced relation and prevents the loss of the balls. Because of the extensive surfaces on the lower end of the cutter and the upper end of the part $32^a$ the balls 51 may be of large diameter.

The means $13^a$ further includes a ball bearing means for transmitting the upward end thrusts from the cutter 11 to the upper block $24^a$. A race part $33^a$ is provided on the upper block $24^a$. While I have shown the part $33^a$ set in a socket in the block $24^a$ and welded to the block it is to be understood that it may be formed integral with the block, if desired. The race part $33^a$ projects from the lower side of the block $24^a$ and has a downwardly projecting tubular flange 53 of reduced diameter which enters the upper end of the cutter opening $22^a$. An annular groove 54 is provided in the reduced part or flange 53. A ball bearing is interposed between the upper end of the cutter 11 and the lower face of the part $33^a$. This ball bearing includes an annular retainer 55 and balls 56 in pockets 57 in the inner face of the retainer. The balls 56 cooperate with a race 58 in the lower side of the part $33^a$ and with the upper end of the cutter 11. The balls 56 are partially received in the groove 54. The groove 54 partially receiving the balls 56 permits the employment of balls of large diameter. The balls 56 cooperating with the upper end of the cutter 11 and the race 58 serve to transmit the upward thrusts from the cutter 11 to the race part $33^a$ with a minimum of friction.

In assembling the construction illustrated in Figs. 5, 6 and 7 of the drawings the retainer 55 carrying the balls 56 is first arranged in position on the upper race part $33^a$. The cutter 11 carrying the rollers $30^a$ and the spacer $31^a$ is then arranged in place and moved upwardly over the flange 53. The retainer 50 carrying the balls 51 is then inserted between the lower end of the cutter 11 and the race part $32^a$. The cutter supporting pin $12^a$ may then be passed downwardly through an opening 59 in the upper end of the body portion 17 and passed through the cutter 11 to have its opposite ends received in the spaced blocks $24^a$ whereupon the pin may be locked in place by the key or pin 45. The operation of the construction illustrated in Figs. 5, 6 and 7 is substantially the same as that of the previously described form of the invention. The rollers $30^a$ dependably transmit the radial thrusts from the cutter 11 to the pin $12^a$. The balls 56 transmit the upward end thrusts from the cutter 11 to the race part $33^a$ and the balls 51 transmit the downward thrusts from the cutter to the race part $32^a$. Thus the cutter 11 is supported for rotation by anti-friction bearing means to rotate with a minimum of friction.

Figs. 8, 9 and 10 of the drawings illustrate a modification of the bearing means illustrated in Figs. 5, 6 and 7. In the construction illustrated in Figs. 8, 9 and 10 the opening $22^b$ of the cutter 11 is of uniform diameter and tubular spacers 60 space the rollers $30^b$ from the upper and lower ends of the cutter. The cutter supporting pin $12^b$ has its opposite ends supported in blocks $24^b$ which may be identical with the blocks $24^a$. The lower block $24^b$ has a race part $32^b$ provided at its upper end with an upstanding annular flange 61. The upper block $24^b$ has a race part $33^b$ provided at its lower end with a downwardly projecting annular flange 62.

The means for transmitting the downward thrusts from the cutter 11 to the race part $32^b$ comprises a ball bearing interposed between the lower end of the cutter and the race part $32^b$. This ball bearing including an annular retainer 63 surrounding the pin $12^b$ and spaced balls 64 retained in the periphery of the retainer 63. The balls 64 cooperate with a race 65 in the upper end of the race part $32^b$ and cooperate with the lower end of the cutter 11. The balls 64 operate within the flange 61. The spaced balls cooperating with the race 65 and the lower end of the cutter 11 are operable to transmit downward thrusts from the cutters to the race part $32^b$ with a minimum of friction.

The thrust bearing means for taking the upward thrusts from the cutter 11 comprises a ball bearing interposed between the upper end of the cutter and the lower side of the race part $33^b$. This ball bearing comprises an annular retainer 66 surrounding the pin $12^b$ and balls 67 in pockets 68 in the retainer. The balls 67 cooperate with the upper end of the cutter 11 and an annular race 69 in the lower side of the part $33^b$. The retainer 66 may be engaged between the upper spacer 60 and the lower end of the part $33^b$, as illustrated in Fig. 10. The balls 67 operate within the annular flange 62.

In assembling the construction illustrated in Figs. 8, 9 and 10 of the drawings the retainer 63, carrying the balls 64 may be arranged in place on the part 62$^b$ and the retainer 66 carrying the balls 67 may be arranged on the lower end of the race part 33$^b$. The retainer 66 may be temporarily held in place by grease or the like. The cutter 11 carrying the rollers 30$^b$ and the spacers 31$^b$ and 60 is then passed inwardly between the race parts 32$^b$ and 33$^b$ so that its ends are engageable by the balls 64 and 67. The pin 12$^b$ is then arranged in place and locked in position by the pin 45. In the operation of the construction illustrated in Figs. 8, 9 and 10 the rollers 30$^b$ dependably transmit the radial thrusts from the cutter 11 to the pin 12$^b$ and the balls 64 are adapted to receive any downward end thrusts from the cutter. The balls 67 cooperate with the upper end of the cutter 11 and the annular race 69 for the transmission of the upward thrusts from the cutter to the race part 33$^b$. The cutter 11 and the various elements of its mounting and bearing means may be readily replaced when worn.

Having described only typical preferred forms and applications of my invention, I do not wish to be limited or restricted to the specific details herein set forth, but wish to reserve to myself any variations or modifications that may appear to those skilled in the art or fall within the scope of the following claims.

Having described my invention, I claim:

1. A well reamer comprising, a body to be connected in a well string, spaced removable blocks on the body, a pin extending between and carried by the blocks, a cutter rotatable on the pin between the blocks, there being opposing races in the ends of the cutter and the blocks, and series of balls cooperating with the opposing races.

2. A well reamer comprising, a body having spaced sockets, blocks set in the sockets, a pin supported by the blocks, a reaming cutter, roller bearing means rotatably supporting the cutter on the pin, race parts on the blocks, and series of balls cooperating with the race parts and the ends of the cutter to support the cutter against end thrusts, one of the race parts projecting into the cutter.

ALFRED C. CATLAND.